United States Patent Office 2,996,507
Patented Aug. 15, 1961

2,996,507
PIPERAZINE COMPOUNDS
Armiger H. Sommers, Lake Forest, Ill., assignor to Abbott Laboratories, North Chicago, Ill., a corporation of Illinois
No Drawing. Filed Sept. 9, 1959, Ser. No. 838,853
8 Claims. (Cl. 260—268)

This invention is concerned with novel piperazine compounds corresponding to the formula

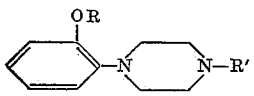

In this and succeeding formulas, R represents lower alkyl containing from 1 to 4 carbon atoms, inclusive, and R' represents lower alkyl containing from 3 to 6 carbon atoms, inclusive. The therapeutically acceptable, non-toxic, acid-addition salts of the bases included in the above formula are also contemplated to be encompassed within the scope of the present invention and are to be considered as equivalents thereof. Appropriate acid-addition salts are those derived from mineral acids such as hydrochloric acid, hydrobromic acid, hydriodic acid, phosphoric acid and sulfuric acid, as well as organic acids such as acetic, citric, tartaric, benzoic, salicylic, glycolic, succinic, nicotinic, ascorbic, maleic, malic or lactic aids, and the like.

The bases as well as the acid-addition salts of said bases are valuable therapeutic agents, and, more particularly, they are extremely useful as hypotensive agents in animals. The compounds also reduce excitement of the animal by relaxing the skeletal muscles to produce a tranquilizing action. When a 25 mg. dose of 1-(ortho-methoxyphenyl)-4-normalpropyl piperazine is administered to a cat via the intravenous route, there is an immediate marked drop in blood pressure.

The new and novel compounds of this invention may be prepared by the reaction of a lower alkylamine with an N,N-bis-(beta-haloethyl)-ortho-alkoxyaniline wherein the halogen may be chlorine, bromine or iodine, but preferably chlorine. The reaction is carried out in the presence of an inert organic solvent such as ethanol, benzene or toluene and takes place smoothly from a temperature of about 30° C. to the reflux temperature of the reaction mixture with the formation of the desired product and hydrohalide of reaction. Good results are obtained when employing at least 3 molecular proportions of the amine per mole of N,N-bis-(beta-haloethyl)-ortho-alkoxyaniline. Upon completion of the reaction, the desired product may be isolated by conventional methods.

The acid-addition salts of the above base products can be readily prepared by methods well known to those skilled in the chemical art. Thus, the base dissolved in a lower alkanol, preferably ethanol, is added to the appropriate acid dissolved in the same solvent in suitable molar amounts. The reaction mixture is then cooled and the salt which precipitates is removed by filtration and dried.

The following examples illustrate the invention but are not to be construed as limiting the scope thereof.

EXAMPLE 1

1-(ortho-methoxyphenyl)-4-n-propylpiperazine

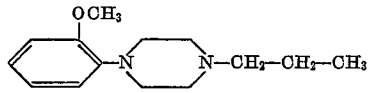

A solution of 7.4 grams (0.03 mole) of N,N-bis-(beta-chloroethyl)-ortho-anisidine and 6 grams (0.1 mole) of n-propylamine in 75 ml. of ethanol is heated at the boiling temperature and under the reflux for 16 hours. The reaction mixture is then concentrated on a steam bath. The residue is washed with 150 ml. of water and the resulting aqueous mixture is extracted with 150 ml. of benzene. The benzene extract is thereafter fractionally distilled under reduced pressure to obtain the desired 1-(ortho-methoxyphenyl)-4-n-propylpiperazine as a viscous oil boiling at 120° C. at 0.2 mm. pressure and having a refractive index n/D of 1.5393 at 25° C.

The hydrochloride salt of the base prepared above is obtained by dissolving one equivalent of said base in isopropyl alcohol and treating the resulting solution with one equivalent of anhydrous hydrogen chloride. The hydrochloride salt which precipitates upon the addition of ether is separated by filtration and is found to melt at 193° C.

The free base can be readily converted to other salts such as the hydrobromide, hydroiodide, sulfate, phosphate, acetate, benzoate, salicylate, glycolate, succinate, nicotinate, ascorbate, tartrate, maleate, malate, lactate, and the like by neutralization with the appropriate acid.

EXAMPLE 2

1-(ortho-methoxyphenyl)-4-isobutylpiperazine

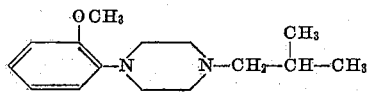

A solution of 25.0 grams (0.1 mole) of N,N-bis-(beta-chloroethyl)-ortho-anisidine and 22 grams (0.3 mole) of isobutylamine in 100 ml. of ethanol is heated at the boiling temperature and under reflux for 16 hours to complete the reaction. Upon completion of the reaction, the reaction mixture is processed as described in Example 1 to obtain the desired 1-(ortho-methoxyphenyl)-4-isobutylpiperazine as a viscous liquid boiling at 120° C. at 0.2 mm. pressure and having a refractive index n/D of 1.5296 at 25° C.

On neutralization of the free base thus prepared with the appropriate acid, the hydrochloride, hydrobromide, hydroiodide, sulfate, phosphate, acetate, benzoate, salicylate, glycolate, succinate, nicotinate, ascorbate, tartrate, maleate, lactate and the like are readily obtained. The hydrochloride salt melts at 239° C.

EXAMPLE 3

In a manner similar to that described in the foregoing examples, other 1-(ortho-methoxyphenyl)-4-alkylpiperazines are prepared by the reaction of the appropriate alkylamine with N,N-bis-(beta-chloroethyl)-ortho-anisidine as shown in the following table:

| Amine Employed | Piperazine Obtained | B.P., °C. at 0.2 mm. Pressure | n/D at 25° C. | M.P., °C., of Mono Hydrochloride Salt |
|---|---|---|---|---|
| isopropyl | 1-(ortho-methoxyphenyl)-4-isopropyl. | 116 | 1.5408 | 244 |
| n-butyl | 1-(ortho-methoxyphenyl)-4-normalbutyl. | 121 | 1.5343 | 215 |
| sec-butyl | 1-(ortho-methoxyphenyl)-4-secondarybutyl. | 151 | 1.5343 | 190 |
| tert-butyl | 1-(ortho-methoxyphenyl)-4-tertiarybutyl. | 117 | | |
| n-amyl | 1-(ortho-methoxyphenyl)-4-normalamyl. | 141 | 1.5298 | [1] 186 |

[1] Dihydrochloride salt.

In a manner similar to that described in Example 1, the following compounds as well as their acid-addition salts can be prepared:

1-(ortho-ethoxyphenyl)-4-sec-butylpiperazine by the reaction of N,N-bis-(beta-chloroethyl)-ortho-ethoxyaniline and sec-butylamine.

1-(ortho-propoxyphenyl)-4-normalhexylpiperazine by the reaction of N,N-bis-(beta-bromoethyl)-ortho-propoxyaniline and normalhexylamine.

1-(ortho-butoxyphenyl)-4-normalpropylpiperazine by the reaction of N,N-bis-(beta-iodoethyl)-ortho-butoxyaniline and normalpropylamine.

1-(ortho-ethoxyphenyl)-4-isoamylpiperazine by the reaction of N,N-bis-(beta-bromoethyl)-ortho-ethoxyaniline and isoamylamine.

1-(ortho-propoxyphenyl)-4-normalbutylpiperazine by the reaction of N,N-bis-(beta-chloroethyl)-ortho-propoxyaniline and normalbutylamine.

Neutralization of any of the above free bases with the appropriate acid results in the formation of the corresponding hydrochloride, hydrobromide, hydroiodide, sulfate, phosphate, acetate, benzoate, salicylate, glycolate, succinate, nicotinate, ascorbate, tartrate, maleate or lactate.

The N,N-bis-(beta-haloethyl)-ortho-alkoxyanilines employed as starting materials in the present invention may be prepared by heating one molecular proportion of an ortho-alkoxyaniline with two molecular proportions of ethylene oxide at a temperature of from 75° to 150° C. in a confined space, preferably a stainless steel bomb. The resulting N,N-bis-(beta-hydroxyethyl)-ortho-alkoxyaniline intermediate is thereafter separated by fractional distillation of the reaction mixture. Further treatment of this intermediate with a phosphorus oxyhalide, preferably POCl₃, followed by heating on a steam bath will produce the desired product which is isolated by adding water to the reaction mixture, extracting said mixture with benzene and fractionally distilling the benzene extract.

This application is a continuation of my copending application U.S. Serial No. 795,581, filed February 26, 1959, now abandoned.

I claim:

1. Piperazine compounds selected from the group consisting of (a) compounds corresponding to the formula

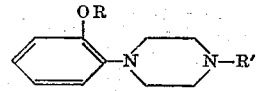

wherein R represents a loweralkyl radical containing from 1 to 4 carbon atoms, inclusive, and R' represents a member of the group consisting of loweralkyl radicals containing from 3 to 6 carbon atoms, inclusive, and (b) pharmacologically acceptable, non-toxic, acid-addition salts thereof.

2. 1-(ortho-methoxyphenyl)-4-normalpropylpiperazine.
3. 1-(ortho-methoxyphenyl)-4-isopropylpiperazine.
4. 1-(ortho-methoxyphenyl)-4-normalbutylpiperazine.
5. 1-(ortho-methoxyphenyl)-4-isobutylpiperazine.
6. 1-(ortho-methoxyphenyl)-4-secondarybutylpiperazine.
7. 1-(ortho-methoxyphenyl)-4-tertiarybutylpiperazine.
8. 1-(ortho-methoxyphenyl)-4-normalamylpiperazine.

References Cited in the file of this patent

Davis et al.: Jour. Chem. Soc. (London), 1949, pp. 2831–2834.